United States Patent  
Kraczek et al.

(10) Patent No.: US 12,398,050 B2
(45) Date of Patent: *Aug. 26, 2025

(54) VACUUM EVAPORATIVE HEAT EXCHANGER

(71) Applicant: SREUS ENERGY, LLC, Sandy, UT (US)

(72) Inventors: John Troy Kraczek, Farmington, UT (US); John Arthur Kraczek, Farmington, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 18/618,037

(22) Filed: Mar. 27, 2024

(65) Prior Publication Data

US 2024/0417282 A1    Dec. 19, 2024

Related U.S. Application Data

(63) Continuation of application No. 17/651,342, filed on Feb. 16, 2022, now Pat. No. 11,945,730.

(Continued)

(51) Int. Cl.
| | |
|---|---|
| C02F 1/16 | (2023.01) |
| B01D 1/00 | (2006.01) |
| B01D 1/04 | (2006.01) |
| B01D 3/10 | (2006.01) |
| B01D 5/00 | (2006.01) |

(Continued)

(52) U.S. Cl.
CPC ............ *C02F 1/046* (2013.01); *B01D 1/0058* (2013.01); *B01D 1/0094* (2013.01); *B01D 1/04* (2013.01); *B01D 3/10* (2013.01); *B01D 3/103* (2013.01); *B01D 5/0048* (2013.01); *B01D 5/006* (2013.01); *B01D 5/009* (2013.01); *C02F 1/16* (2013.01);

(Continued)

(58) Field of Classification Search
CPC ......... C02F 1/04–18; F01K 17/06; F26B 3/20
See application file for complete search history.

(56) References Cited

U.S. PATENT DOCUMENTS

| | | | |
|---|---|---|---|
| 4,291,539 A | 9/1981 | Potter | |
| 9,708,937 B2 | 7/2017 | Janicki | |
| 11,945,730 B2 * | 4/2024 | Kraczek | B01D 3/103 |

FOREIGN PATENT DOCUMENTS

EP    2000635 A1    12/2008

OTHER PUBLICATIONS

International Search Report and Written Opinion for PCT Application No. PCT/US2022/070681, mailed on Jun. 3, 2022, 10 pages.

(Continued)

*Primary Examiner* — Jonathan Luke Pilcher
(74) *Attorney, Agent, or Firm* — Brake Hughes Bellermann LLP

(57) ABSTRACT

Techniques are described herein for using a high-pressure reactor to separate clean water from dirty water without filtration and to extract and concentrate contaminants from dirty water for use as a fuel. In particular, techniques and systems are described for separating water from hydrocarbon contaminates, other BTU-laden compounds, and dissolved minerals, while also boiling water and condensing the resulting steam into distilled water. In addition, system in which the described techniques are performed can be used as a high-pressure pump for moving the separated hydrocarbon contaminates forward into other processes, such as a high-pressure reactor or incinerator.

20 Claims, 3 Drawing Sheets

Related U.S. Application Data

(60) Provisional application No. 63/200,125, filed on Feb. 16, 2021.

(51) Int. Cl.
*C02F 1/04* (2023.01)
*F01K 17/06* (2006.01)
*C02F 103/02* (2006.01)
*C02F 103/08* (2006.01)

(52) U.S. Cl.
CPC .......... *F01K 17/06* (2013.01); *C02F 2103/02* (2013.01); *C02F 2103/08* (2013.01)

(56) References Cited

OTHER PUBLICATIONS

U.S. Appl. No. 17/651,342, filed Feb. 16, 2022, Allowed.

\* cited by examiner

VACUUM EVAPORATIVE HEAT EXCHANGER

CROSS-REFERENCE TO RELATED APPLICATIONS

This application is a continuation application of U.S. patent application Ser. No. 17/651,342, filed Feb. 16, 2022, and titled, "VACUUM EVAPORATIVE HEAT EXCHANGER," which claims the benefit of and priority to U.S. Provisional Application No. 63/200,125, filed Feb. 16, 2021, and titled, "VACUUM EVAPORATIVE HEAT EXCHANGER," these applications are incorporated by reference herein in their entireties.

TECHNICAL FIELD

This disclosure relates to techniques for purifying water and, in particular, to purification of water with a vacuum evaporative heat exchanger.

BACKGROUND

Access to clean water, and the removal of contaminants from water to create clean water, is an increasing need in the world. Many common water contaminates include hydrocarbons, which maybe provide a source of energy if they are removed from the water. Examples of contaminated water include oil production water, paper pulp slurry, food and rendering plant wash down, biofuel process waste fluids, sewer water, animal waste wash down water, and dairy wash down water. If the water can be separated from the contaminates, then the water can be reused, and the contaminates may be used as fuel.

SUMMARY

Techniques are described herein for using a high-pressure reactor to separate clean water from dirty water without filtration and to extract and concentrate contaminants from dirty water for use as a fuel. In particular, techniques and systems are described for separating water from hydrocarbon contaminates, other BTU-laden compounds, and dissolved minerals, while also boiling water and condensing the resulting steam into distilled water. In addition, system in which the described techniques are performed can be used as a high-pressure pump for moving the separated hydrocarbon contaminates forward into other processes, such as a high-pressure reactor or incinerator.

In some aspects, the techniques described herein relate to a system including: an oxidation reactor configured to oxidize combustible fuel to produce heat and hot steam as a result of the oxidation of the fuel; a first chamber having a hollow first cavity configured to be loaded with water and the fuel; a vacuum pump operationally connected to the hollow first cavity and configured to draw a vacuum on the hollow first cavity to lower a boiling point of water in the hollow first cavity to a lowered boiling point at least 20° F. below the boiling point of water at atmospheric pressure; a second chamber including a hollow second cavity that at least partially surrounds the hollow first cavity, the hollow second cavity being operationally connected to the oxidation reactor to receive the hot steam from the oxidation reactor, such that the hot steam in the hollow second cavity causes water in the hollow first cavity to boil to cold steam at the lowered boiling point; a movable piston located within the hollow first cavity and in scalable contact with an inner wall of the first chamber and configured to move along a length of the first chamber to mechanically move residual fuel in the hollow first cavity to the oxidation reactor, wherein the residual fuel remains in the first cavity after water in the hollow first cavity boils to cold steam before it is moved to the oxidation reactor; and a hydraulic pump operationally connected to the hollow first cavity and configured to pump liquid in and out of the hollow first cavity to move the movable piston between a first position in which the fuel and water is loaded into the hollow first cavity and a second position in which the residual fuel is moved from the hollow first cavity to the oxidation reactor.

In some aspects, the system further includes a heat exchanger configured for receiving the cold steam from the hollow first cavity and condensing the cold steam into a liquid.

In some aspects, the system further includes a steam condensate tank operationally connected to the hollow second cavity and configured for receiving condensate produced in response to heat transferred from the hot steam in the hollow second cavity to the water and fuel in the hollow first cavity.

In some aspects, the system further includes a drive system operationally coupled to the oxidation reactor and to the hollow second cavity between the oxidation reactor and the hollow second cavity and configured for receiving the hot steam from the oxidation reactor and converting energy in the hot steam into mechanical energy and then passing the hot steam to the hollow second cavity.

In some aspects, the oxidation reactor is configured to produce heat and hot steam as a result of the oxidation of the fuel at a temperature of greater than 500° F.

In some aspects, the lowered boiling point is at least 110° F. below the boiling point of water at atmospheric pressure.

In some aspects, the hollow first cavity includes a first end operationally coupled to the hydraulic pump and a second end operationally coupled to the vacuum pump, the first end and the second end being separated by the movable piston in the hollow first cavity.

In some aspects, the movable piston includes stainless steel and a sealing surface on an outer surface of the piston that seals against an inner wall of the hollow first cavity, wherein the sealing surface is configured to remove condensate material from the inner wall of the hollow first cavity.

In some aspects, the first chamber includes at least one copper wall defining the hollow first cavity.

In some aspects, the second chamber includes at least one copper wall defining the hollow second cavity.

In some aspects, the techniques described herein relate to a method including: oxidizing combustible fuel in an oxidation reactor to produce heat and hot steam as a result of the oxidation of the fuel; loading a hollow first cavity of a first chamber that is operationally connected to the oxidation reactor with water and the fuel; drawing a vacuum on the hollow first cavity to lower a boiling point of water in the hollow first cavity to a lowered boiling point at least 20° F. below the boiling point of water at atmospheric pressure; providing the hot steam from the oxidation reactor to a hollow second cavity of a second chamber that at least partially surrounds the hollow first cavity, such that the hot steam in the hollow second cavity causes water in the hollow first cavity to boil to cold steam at the lowered boiling point; moving a movable piston located within the hollow first cavity and that is in scalable contact with an inner wall of the first chamber along a length of the first chamber to mechanically move residual fuel in the hollow first cavity to the oxidation reactor, wherein the residual fuel remains in the first cavity after water in the hollow first cavity boils to cold steam before it is moved to the oxidation reactor, wherein the residual fuel that is moved into the oxidation reactor provides the combustible fuel for oxidation in the oxidation reactor; and pumping liquid in and out of the hollow first cavity to cause the movement of the movable piston between a first position in which the fuel and water is loaded into the hollow first cavity and a second position in which the residual fuel is moved from the hollow first cavity to the oxidation reactor.

In some aspects, the method further includes condensing the steam from the hollow first cavity into a liquid.

In some aspects, the method further includes receiving into a steam condensate tank operationally connected to the hollow second cavity condensate produced in response to heat transferred from the hot steam in the hollow second cavity to the water and fuel in the hollow first cavity.

In some aspects, the method further includes: receiving into a drive system operationally coupled to the oxidation reactor and to the hollow second cavity between the oxidation reactor and the hollow second cavity the hot steam from the oxidation reactor; converting energy in the hot steam into mechanical energy; and passing the hot steam to the hollow second cavity.

In some aspects, the oxidation of the fuel in the oxidation reactor occurs at a temperature of greater than 500° F.

In some aspects, the lowered boiling point is at least 110° F. below the boiling point of water at atmospheric pressure.

In some aspects, the hollow first cavity includes a first end operationally coupled to the hydraulic pump and a second end operationally coupled to the vacuum pump, the first end and the second end being separated by the movable piston in the hollow first cavity.

In some aspects, the movable piston includes stainless steel and a sealing surface on an outer surface of the piston that seals against an inner wall of the hollow first cavity, wherein the sealing surface is configured to remove condensate material from the inner wall of the hollow first cavity.

In some aspects, the first chamber includes at least one copper wall defining the hollow first cavity.

In some aspects, the second chamber includes at least one copper wall defining the hollow second cavity.

DETAILED DESCRIPTION

Figure 1:
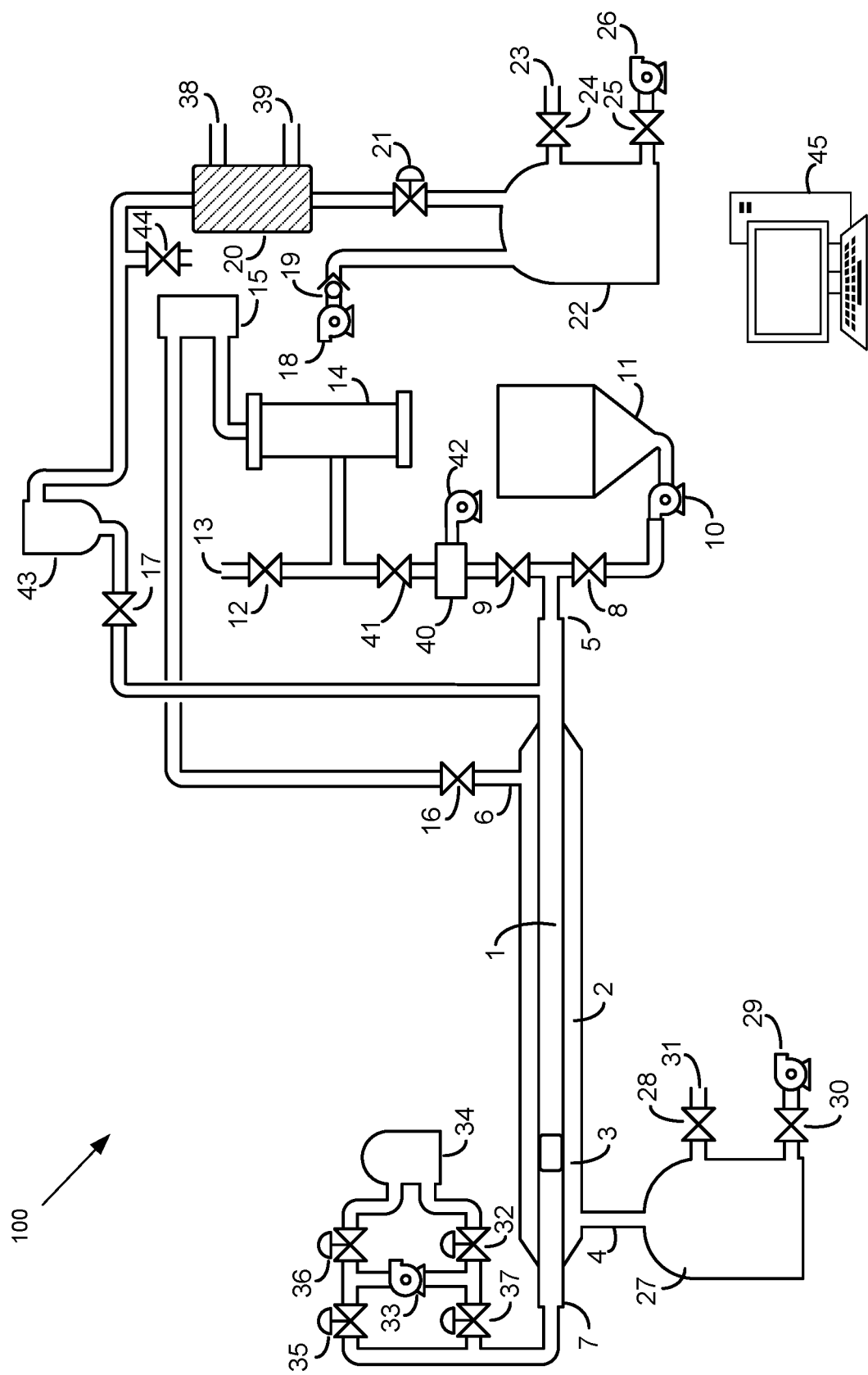
FIG. 1 is a schematic diagram of a system for creating clean water from contaminated water.

FIG. 1 is a schematic diagram of a system 100 for creating clean water from contaminated water. The system 100 includes, among other things, a storage tank 11 for storing contaminated water, a hollow chamber 1 into which contaminated water is injected and in which fuel is separated from water, a high-pressure, high-temperature oxidation reactor 14 that consumes fuel extracted from the contaminated water and that produces heat, and a second chamber 2 that surrounds the first chamber 1 forming a jacket around the first chamber 1 and to which hot steam from the high-temperature reactor can be supplied. In some implementations, the high-pressure, high-temperature oxidation reactor 14 can include a super-critical water oxidation reactor. In some implementations, the high-pressure, high-temperature oxidation reactor 14 can burn fuel that is extracted from the contaminated water.

Figure 2C:
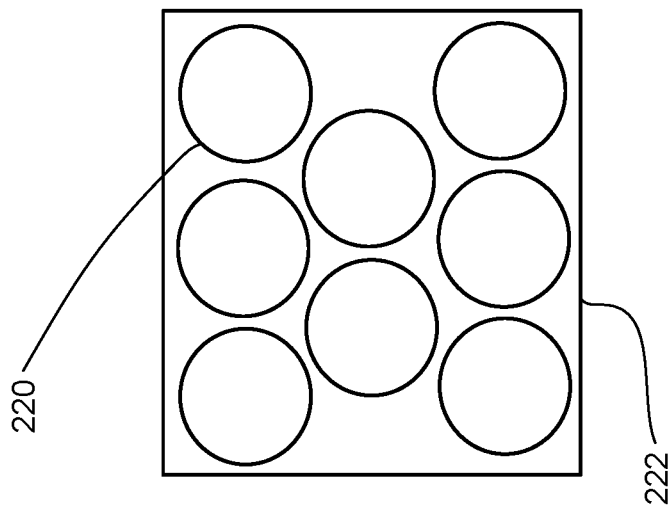
FIG. 2C is a schematic diagram of multiple example first chambers defined by walls having a circular cross section contained within an example second chamber defined by a wall with a rectilinear cross section.
Figure 2B:
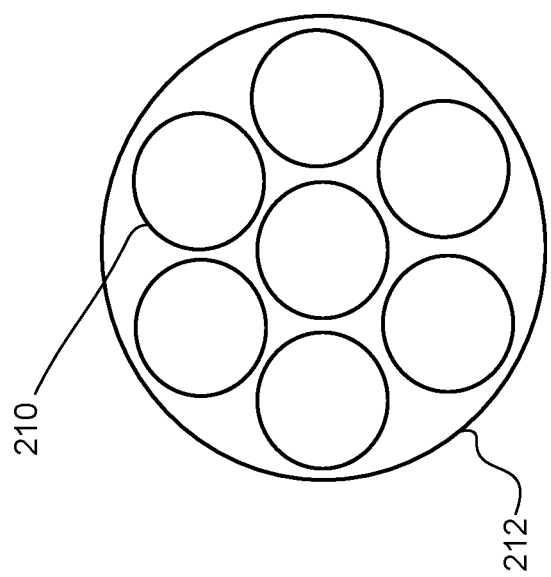
FIG. 2B is a schematic diagram of multiple example first chambers defined by walls having a circular cross section contained within an example second chamber defined by a wall with circular cross section.
Figure 2A:
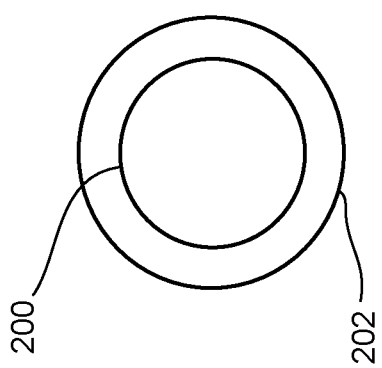
FIG. 2A is a schematic diagram of an example first chamber defined by a wall having a circular cross section contained within an example second chamber defined by a wall with circular cross section.

The second chamber 2 can at least partially surrounded the first chamber 1, such that the second chamber 2 forms a jacket around the first chamber 1. In some implementations, the first chamber 1 can include a first cylindrical tube and the second chamber 2 can include a second cylindrical tube, and the tubes can be concentric along a common axis. The first chamber 1 and the second chamber 2 each can have an inner wall diameter and an outer wall diameter, with the inner wall diameter of the second chamber 2 being larger than the outer wall diameter of the first chamber, such that a cavity is formed between the outer wall of the first chamber 1 and the inner wall of the second chamber 2. In an implementation, the first chamber 1 and the second chamber 2 can be straight, but the tubes need not be straight. The first and second chambers need not have circular cross sections but can have other shapes as well, including rectilinear cross sections. FIG. 2A is a schematic diagram of an example first chamber defined by a wall 200 having a circular cross section contained within an example second chamber defined by a wall 202 with circular cross section.

The first chamber 1 includes a sliding plunger (e.g., floating piston) 3 that includes a wiper seal that seals against an inner wall of the first chamber 1. Contaminated liquid is loaded into the first chamber, and a vacuum pump 18 evacuates gas from within the chamber 1 to reduce a pressure in the chamber 1, thus pulling a vacuum on the contents of the chamber 1 and reducing the boiling point of the liquid in the first chamber 1. Steam is passed into the second chamber 2 in the cavity between the outer wall of the first chamber 1 and the inner wall of the second chamber 2, and the steam condenses on the outer wall of the first chamber 1. The heat from the steam in the second chamber 2 and the vacuum pressure in the first chamber causes the liquid in the first chamber 1 to boil, leaving behind the concentrates and minerals that were dissolved in the liquid. These concentrates are then pushed out of the first chamber 1 and into a oxidation reactor 14 or in another system for further processing. Steam from the boiled liquid from within the first chamber 1 can be collected and condensed, thus separating, and purifying, the liquid that was injected into the chamber from the contaminants in liquid.

Walls of the first chamber 1 can be made of, for example, copper, stainless steel, glass, ceramic, carbon fiber, or other appropriate material. Inner walls of the chamber 1 can can be lined with a non-reactive material, such as, for example, ceramic or PTFE.

The second chamber 2 (e.g., an outer tube or jacket) can surround the first chamber 1 for the purpose of containing steam in a cavity between an inner wall of the second chamber in an outer wall of the first chamber, such that the steam can condense against the inner chamber 1. Metal fins or metal mesh can be attached to the outer wall of the first chamber and used to enhance the heat transfer from the steam in the second chamber 2 to contents within the first chamber 1.

A piston 3 can slide within the first chamber 1, making a contact seal with the inner wall of the first chamber. The piston 3 can be made of copper, stainless steel, glass, ceramic, carbon fiber, or other appropriate material, and can include one or more surfaces that make a sealing contact with the inner wall of the second chamber 2. The sealing surfaces can include, for example, PTFE or some other suitable material that can withstand higher temperatures without melting and sticking to the inner wall of the first chamber 1. In some implementations, the piston 3 can be include a stainless steel cylinder (or other shape that matches the cross section of the inner wall of the second chamber) an can have one or more o-ring sealing surfaces on its outer surface that make a sealing contact with the inner wall of the second chamber 2 to create a water- and air-tight seal between portions of the first chamber 1 on opposite sides of the piston 3.

The second chamber 2 includes a discharge point 4 through which condensate (e.g., water) from the steam that condenses within the second chamber 2 can exit the chamber 2.

A first end portion of the first chamber 1 can include a reducer 5 (e.g., portion of the first chamber having an inner diameter that is smaller than an inner diameter of a main portion of the chamber) through which contaminated liquid flows into a main portion of the first chamber 1 and through which concentrated fuel flows out of a main portion of the first chamber 1. The reducer 5 can prevent the piston 3 from traveling beyond a first end and leaving the main portion of the first chamber 1, because its diameter is smaller than that of the piston 3.

An inlet port 6 on second chamber 2 can receive hot steam emitted from the oxidation reactor 14 into the second chamber 2, in some cases, after energy of the hot steam has been used to perform work in a mechanical drive system 15.

A second end portion of the first chamber 1 can include a reducer 7 (e.g., a portion of the chamber 1 having an inner diameter that is smaller than an inner diameter of a main portion of the chamber) on the piston hydraulic drive side which prevents the piston 3 from traveling beyond a second end of chamber 1.

A control valve 8 between the first chamber 1 and the contaminated supply water tank/hopper 11 can be operated to allow contaminated liquid to pass from a storage tank or hopper 11 that stores contaminated water into the first chamber 1 when the value 8 is opened. When the control valve 8 is closed, it can allow vacuum to be drawn on the first chamber 1 and can prevent concentrates from being pushed back to the contaminated supply water tank/hopper 11.

A control valve 9 between the first chamber 1 and the oxidation reactor 14 can be operated to allows vacuum to be drawn on chamber 1 and to prevent high-pressure reactor fluid from traveling backwards from the reactor into chamber 1 when the value 9 is closed. When the value 9 is open, it can allow pressurized concentrates to move from the first chamber 1 into the high-pressure oxidation reactor 14.

A pump 10 operably connected to the contaminated supply water tank/hopper 11 can be operated to move the contaminated water from the tank/hopper 11 through valve 8 and into the first chamber 1.

A control valve 12 operably connected to the high-pressure oxidation reactor 14, when closed, forces high-pressure concentrate that passes through valve 9 from the first chamber 1 into the high-pressure oxidation reactor 14. When the value 12 is open, it can allow combustible fuel and other materials from additional systems connected beyond a connection point 13 to be pumped into the high-pressure oxidation reactor 14.

The high-pressure, high-temperature oxidation reactor 14 can combust, oxidize, or otherwise react the concentrated hydrocarbons and other minerals that are received from chamber 1 into the oxidation reactor 14 to produce heat, clean water, and fully broken-down hydrocarbon molecules and metal oxides. The oxidation reactor 14 can operate at pressures of hundreds to thousands of PSI and can operate at temperatures of higher than 700 degrees Fahrenheit.

In some implementations, a mechanical drive system 15 operably connected to the high-pressure, high-temperature oxidation reactor 14 can use energy in hot gas, supercritical water, or high temperature steam (e.g., from oxidation reactor 14) to perform mechanical work, such as to generate electricity, drive compressors, create motion, etc.

A control valve 16 between the second chamber 2 and the oxidation reactor 14 can be operated to allow energy (e.g., steam) from oxidation reactor 14 or from the drive system 15 to pass into the chamber 2.

In some implementations, the system 100 can include multiple first chambers 1 that are contained within one or more second chambers 2. FIG. 2B is a schematic diagram of multiple example first chambers defined by walls 210 having a circular cross section contained within an example second chamber defined by a wall 212 with circular cross section. FIG. 2C is a schematic diagram of multiple example first chambers defined by walls 220 having a circular cross section contained within an example second chamber defined by a wall 222 with a rectilinear cross section. When running multiple systems that include multiple pairs of first chambers 1 and/or second chambers 2, the system 100 can include multiple valves 16 that can be used to determine which of the chambers the steam is directed to.

A control valve 17 between the first chamber 1 and condensate heat exchanger 20 is positioned such that when closed it blocks the flow of high-pressure concentrate from moving from the first chamber 1 into a heat exchanger 20. When open, the control valve 17 allows the vacuum steam from first chamber 1 to travel to the heat exchanger 20. The condensate heat exchanger 20 can receive vacuum generated steam from the first chamber 1 and then cool the steam to condensate using cooler water or glycol that enters the heat exchanger 20 from port 38 and leaves the heat exchanger 20 from port 39. Ports 38, 39 in the heat exchanger 20 allow cooling fluid to pass through the heat exchanger 20. In some implementations, the system 100 can include a catchment hopper 43 located between the valve 17 and heat exchanger 20, which can catch boil-over material from the chamber 1. For example, the hopper 43 can receive liquid and gas from the chamber and can include an output port at the top of the hopper through which gas (e.g., vacuum steam) is provided to the heat exchanger. Liquid can be drained from the hopper 43 though drain port that is opened by value 44.

A vacuum pump 18 can be operationally connected to first chamber 1 and can draw down the pressure in chamber 1 to a pressure less than atmospheric pressure (e.g., by more than 500 torr below atmospheric pressure). In some implementations the pump 18 can be connected to the first chamber 1 through a condensate tank 22 and the heat exchanger 20. A high vacuum check valve 19 between the pump 18 and the first chamber 1 can be closed to maintain vacuum on the chamber 1 and the heat exchanger 20 even when pump 18 is turned off. The condensate tank 22 can be used for collecting the vacuum distilled water that is created in the first chamber 1 and condensed in the heat exchanger 20. The tank 22 can be created and configured to hold a vacuum pressure when gas is pumped out of it by pump 18.

A control valve 21 located between the heat exchanger 20 and the condensate tank 22 can be controlled to allow the condensate from the exchanger 20 to drain into the vacuum condensate tank 22. When closed, the valve 21 allows vacuum to be maintained on chamber 1 and heat exchanger 20 while condensate tank 22 is drained. A port connection 23 connects the tank to atmospheric air, and air that flows into the tank 22 can be filtered before entering tank 22 through valve 24. The control valve 24 can allow atmospheric air into the condensate tank 22, so that the tank can be drained of condensate, and when the valve 24 is closed atmospheric air is blocked from the condensate tank allowing vacuum to build up in the condensate tank 22.

De-contaminated condensate (e.g., purified water) can be pumped out of the tank 22 by a pump 26 into a storage tank maintained at normal atmospheric pressure. A control valve 25 between the condensate tank 22 and the pump 26 can be closed to allow vacuum to build up in the tank.

A steam condensate tank 27 can collect the steam condensate from the second chamber 2. The tank 27 can be maintained at atmospheric pressure. A control valve 28 on an inlet port 31 to the tank 27 can be used to close off the atmospheric vent for condensate tank 27. The port 31 allow air into tank 27, where the air may pass through a filter (e.g., a HEPA rated filter) to prevent dust or contaminates from entering tank 27. Air from the inlet port 31 allows the tank to remain at atmospheric pressure when valve 28 is open. The valve 28 is normally open to allow water to enter the tank and air to leave the tank or vice versa when the tank is being emptied through valve 30. A pump 29 that acts as a condensate transfer pump can send the "hot steam" purified condensate forward to storage tanks or for use as process, irrigation, pre-drinking water, etc. A valve 30 between the tank 27 and the pump 29 is normally closed to contain the condensate in condensate tank 27, and when open allows condensate to reach the pump 29.

A hydraulic pump 33 can be coupled to the first chamber 1 to increase the pressure in the chamber 1. In some implementations, the pump 33 is capable of reaching pressures higher than the operating pressures inside oxidation reactor 14, so that material from the chamber 1 can be pressurized to a pressure greater than that of the reactor for injection into the reactor. A control valve 32 that when open allows fluid from a hydraulic reservoir 34 containing a hydraulic fluid or water for use as a hydraulic fluid to reach pump 33. The hydraulic pump 33 pushes fluid against the sliding piston 3 to force the piston through the first chamber 1 to move concentrate forward to oxidation reactor 14, or the pump 33 draws hydraulic fluid back from the first chamber 1 to pull the piston 3 back to its starting place close to the reducer 7. The pump 33 can be a fixed displacement or piston type pump.

A control valve 35 allows hydraulic fluid to move from the pump 33 in and out of the first chamber 1 and to control the position of piston 3. When closed, the valve 35 prevents the flow of hydraulic fluid in this loop. A control valve 36 allows hydraulic fluid being pumped by the pump 33 to flow into the reservoir 34. A control valve 37 that when open allows the pump 33 to draw hydraulic fluid out of the first chamber 1 and to pull the piston 3 back toward the reducer 7. When closed, the valve 37 allows fluid to build up pressure as it passes through control valve 35 to push the piston 3 back toward position 5.

In some implementations, the operating pressure of the first chamber 1 can be below that of the oxidation reactor 14. For example, if the walls of the chamber 1 are made of soft, malleable materials (e.g., copper), operating a reduced pressure as compared with that of the oxidation reactor 14 may be advantageous to prevent deformation of the shape of the chamber 1. In some implementations, material expelled from the chamber 1 and passed through valve 9 can be collected in a chamber 40, while control value 41 is closed. Then, valve 9 can be closed, and pump 42 can pressurize the contents of the chamber 40 to a pressure close to, or exceeding, the operating pressure of the oxidation reactor 14, and then injected into the reactor upon opening the valve 41.

The system 100 can be used for separating contaminates from dirty water, using the separated contaminates as fuel in a oxidation reactor 14, and using the oxidation reactor 14 to produce power. Steam produced from the contaminated water, produced by the oxidation reactor 14 and by distilling the water, can be condensed in two streams of distilled and condensate water for use.

Referring to FIG. 1, water containing contaminants can be deposited and stored in the tank or hopper 11, and then pumped from the tank 11 through pump 10 and through control valve 8 into the first chamber 1. The flow of the contaminated liquid from tank 11 can be blocked from going to elsewhere in the system 100 by the closure of valve 9, the closure of valve 17, and by opening valve 37, while activating pump 33 and opening valve 36. The pressure on the liquid from pump 10 and the vacuum on the liquid from pump 33 draws the piston 3 back along first chamber 1 to position 7.

A timer, or a fixed displacement metering system, connected to a programmable system controller 45, can ensure that a predetermined amount of liquid from tank 11 passing through pump 10 does not completely fill first chamber 1 and that air space is left in the first chamber 1 to allow steam to pass across the top of the liquid from hopper 11. Once the first chamber 1 is loaded with a measured amount of contaminated liquid, the pump 10 is shut off by the system controller 45. Valve 8 is closed, while valves 9, 17 remain closed. Valve 37 closes and valve 32 opens, and valve 36 opens, and pump 33 is shut down, so that piston 3 can move to the left in the first chamber 1 toward reducer 7.

Then, with valve 17 open and valves 24 and 25 closed, vacuum pump 18 is activated, and valve 21 is opened to draw vacuum over the contaminated water inside of the first chamber 1. Activating vacuum pump 18 begins to draw air and gas from the top of the liquid in the first chamber 1, and the gas and vapors are drawn through heat exchanger 20. The vacuum created by pump 18 also creates a vacuum in the condensate collection tank 22. This vacuum causes the boiling point of the liquid in the first chamber 1 to drop substantially, for example, to below 100 degrees Fahrenheit. When the system controller 45 has determined that the vacuum has reached a high enough level, then valve 16 is opened, allowing steam from the steam drive system 15 to flow through the second chamber 2. Then, valve 28 can be opened to allow cooler air to flow into the second chamber 2 and to prevent back pressure on the steam entering the second chamber 2.

When steam is received from the drive system 15 into the second chamber 2, such that the steam in the second chamber 2 passes around first chamber 1, the steam is cooled by the cooler temperature of the wall of the first chamber (due, at least in part, to the evaporating liquid in the first chamber 1) below the condensation point of the steam. This causes the steam in the second chamber 2 to turn into water as heat from the steam is transferred to the liquid inside of first chamber 1.

The liquid inside of the first chamber 1 begins to boil, as a result of the low pressure inside the chamber 1 and as a result of the heat supplied by the steam in the second chamber 2. As the water in the first chamber 1 boils, the resulting steam travels along the surface of the liquid in first chamber 1, and then up and through valve 17 and into the heat exchanger 20. As the liquid is boiling in first chamber 1, it leaves behind minerals and hydrocarbons, which began to concentrate in the first chamber 1. As the steam reaches the heat exchanger 20 (e.g., at a temperature of approximately 80 to 120 degrees Fahrenheit, e.g, more than 110° F. below the boiling point of water at atmospheric pressure), a cooler liquid that passes through the heat exchanger 20 causes that steam to re-condense into liquid as it gives up heat to the heat exchanger 20. As the steam becomes liquid again in the heat exchanger 20, it creates additional vacuum, which continues to pull on the liquid in first chamber 1. When the system controller 45 has determined that the condensate vacuum is high enough, vacuum pump 18 may be turned off, for the duration of the cycle, or may be turned on and off in order to maintain the correct level of vacuum on heat exchanger 20 and first chamber 1. The liquid that condensates in heat exchanger 20 then travels down through valve 21 and into the condensate collection tank 22, where it is allowed to build up until some predetermined level is reached.

At that point, valve 25 may be opened, and pump 26 may be used to pump out the condensate. If, due to the vacuum pressure, the condensate pump 26 cannot overcome the negative pressure and it cavitates, then valve 24 can be opened after valve 21 is closed to allow the liquid to be pumped out. Once a low level is reached in tank 22, then valve 24 can be closed and valve 25 can be closed, and the pump 29 can be turned off.

Once the condensate tank 22 has been drained, valve 21 can be reopened, vacuum pump 18 can be re-engaged, and vacuum can be re-established inside of tank 22 as well as through heat exchanger 20 and back to the first chamber 1.

When the system controller, using level sensors in tank 22, and/or temperature sensors in the first chamber 1, determines sufficient water has been boiled out of the concentrate in chamber 1, the system can be changed to a discharge mode. To accomplish this, valve 17 is closed, valve 35 is opened, pump 33 is activated as valve 32 is opened. This forces hydraulic fluid from reservoir 34 to pass valve 35 and into the first chamber 1, which pushes the piston 3 against the concentrate that has been left behind in the first chamber 1. Valve 9 is then opened to allow the concentrate to be pushed by piston 3 into oxidation reactor 14, using the pressure from pump 33.

The system controller 45 can control pump 33 through a variable frequency drive or other mechanism to control the rate at which the fluid passes through valve 35 and into the first chamber 1 and therefore the flow rate controls the rate at which the concentrate in the first chamber 1 is pushed into the oxidation reactor 14. As the oxidation reactor 14 receives the fuel and concentrated minerals, it oxidizes these incoming components to produce high temperature water under high-pressure and significant heat. That heat energy is used by releasing super critical water, steam, or hot high-pressure gas, from oxidation reactor 14 to a drive system 15. The drive system 15 may include a traditional steam piston drive arrangement, a turbine, or other super-critical water drive system. The drive system 15 may include some other mechanism that uses expanding supercritical water or steam to do work such as compression of gas or other expansion. When the steam has performed work in the drive system 15, it is vented through valve 16 and into the second chamber 2 through inlet port 6. The steam in the second chamber 2 condenses on the inner tube 3 and produces the condensate which is collected in condensate tank 27.

Typically valve 28 remains open, and when condensate tank 27 reaches a predetermined level, valve 30 is opened and pump 29 pumps this condensate out to either a storage tank or for use.

The liquid in both tank 27 and tank 22 is first-pass distilled water, meaning it is very clean. The liquid in tank 27 is both clean and also completely sterile. The liquid in tank 22 is very clean, although may not be considered sterile without testing.

When the piston 3 has reached the right side of the first chamber 1 near reducer 5, the system is ready to be reset and loaded with new fuel and water for separating. At this point, valve 16 is closed, and steam from the drive 15 is directed to a different system or vented. Valve 9 is closed, valve 37 is open, valve 8 is open, and valve 36 is open, pump 33 is activated, and pump 10 is activated, allowing more of the liquid from tank 11 to be moved into first chamber 1, for processing. In this process, again the piston 3 will move from a position near reducer 5 to a position near reducer 7. And then the process will be restarted.

While it may be possible to run the system on a single first chamber 1, as shown in FIG. 1, multiple sets of vacuum chambers 1 also can be used (with each chamber being surrounded by one or more second chambers 2), for example, in a carousel design, so that fuel can be continuously delivered to oxidation reactor 14, and so that steam from drive 15 can be continuously discharged through this system.

Water, while undergoing a phase change, requires the transfer of heat to change temperature and phase. This is different or independent of temperature, although a temperature differential is required for the heat to transfer from one body to another. As described herein, the ability to place vacuum on a cooler liquid (e.g., water) and concentrate for separation, in the first chamber 1, lowers the boiling point of the water in chamber 1 significantly. The spent steam coming from drive 15 carries with it not only a higher temperature (e.g., between 200 to 230 degrees Fahrenheit), it also carries with it latent heat, where the latent heat must be extracted from the steam for the steam to condense back to liquid. In general, the steam will not drop in temperature below its boiling/condensation point until it has given up the latent heat that it carries, at which point it will cross the phase transition and become liquid. In other words, the temperature of the steam, at that transition point will remain constant until it has given up enough heat that the steam becomes liquid.

In the first chamber 1, the dirty water that is to be separated into clean water and concentrate, undergoes a similar phenomenon in reverse. The temperature of the dirty water rises until it reaches its boiling point, at which point its temperature will not rise any further until it has absorbed additional heat which allows the liquid water to boil to steam.

By placing a vacuum on the first chamber 1, the boiling point of the water in the solution is lowered from typically 212 degrees Fahrenheit at sea level or 204 degrees Fahrenheit at mountain elevations, to somewhere around 70-80 degrees Fahrenheit at 135 torr. Thus, the boiling point of the water in the solution can be lowered, in some implementations, to more than 110° F. below the boiling point of water at local atmospheric pressure.

Thus, when the steam coming into the second chamber 2 with a temperature of over 200 degrees Fahrenheit contacts the outer wall of the first chamber 1 (or fins connected with the first chamber), which contains water that cannot rise above 70 or 80 degrees Fahrenheit because of the reduced boiling point caused by vacuum, heat is transferred from the steam in the outer jacket of the second chamber to the liquid in the first chamber 1, causing the liquid in the first chamber 1 to boil at 70-80 degrees Fahrenheit. This heat transfer is very efficient because the temperature difference between the two fluids is so high. At around a temperature difference between the two liquids of about 100 degrees Fahrenheit, the heat will readily flow to the cooler liquid, thereby boiling the liquid and at the same time extracting enough heat from the steam in the second chamber 2 to condense the steam back into water; then the condensate can further lose both heat and temperature until its temperature approaches 90 to 100 F.

The system controller 45 can include one or more memory devices storing computer readable instructions and one or more processors configured for executing the instructions. The instructions may be executed to programmatically control operation of the system 100. For example, the timing of the opening and closing of the valves of the system 100 can be controlled according to the techniques described herein.

Figure 3:
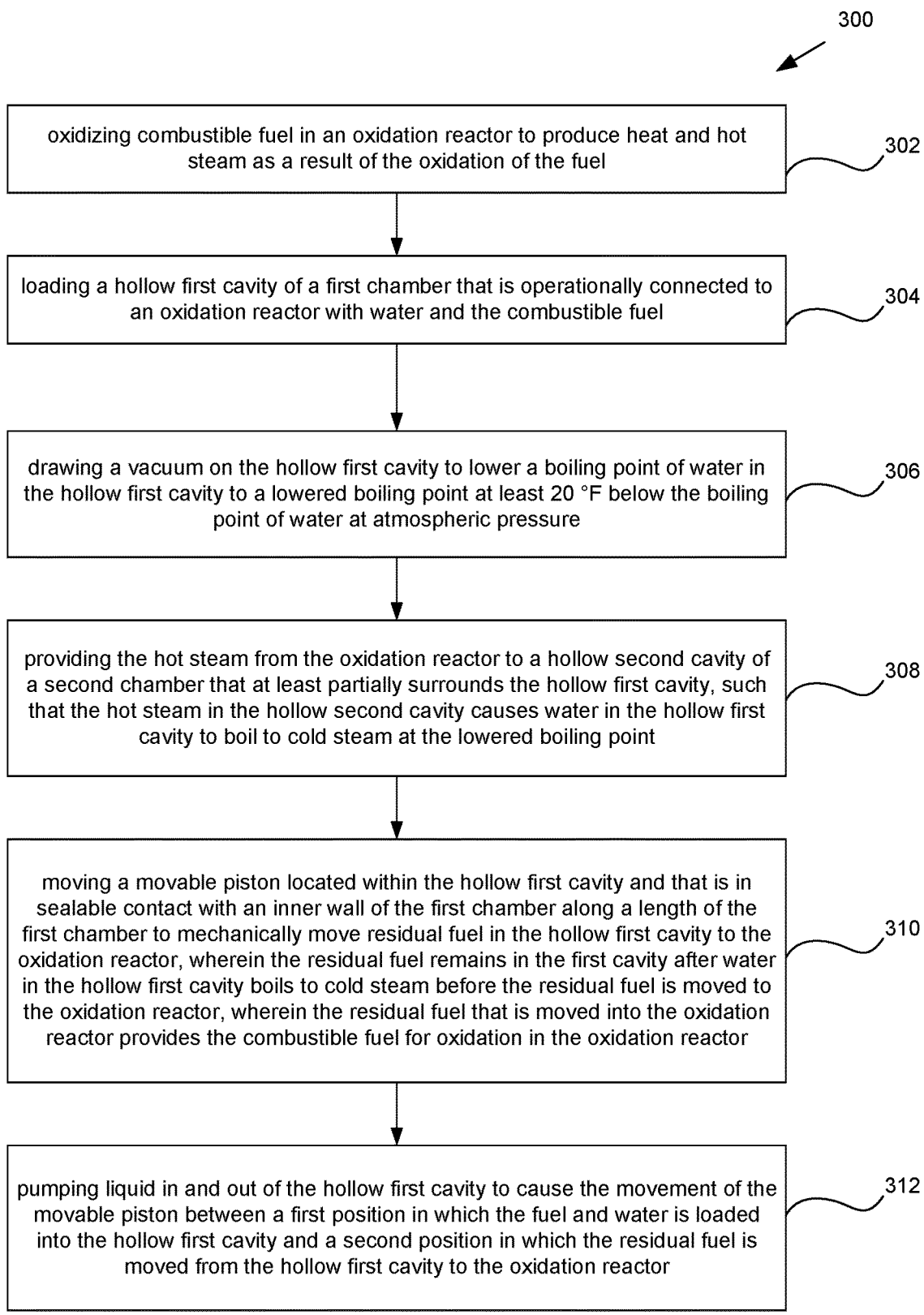
FIG. 3 is a flow chart of a process for purifying contaminated water.

FIG. 3 is a flow chart of a process 300 for purifying contaminated water. The process includes oxidizing combustible fuel in an oxidation reactor to produce heat and hot steam as a result of the oxidation of the fuel (302). The process includes loading a hollow first cavity of a first chamber that is operationally connected to the oxidation reactor with water and the combustible fuel (304). The process includes drawing a vacuum on the hollow first cavity to lower a boiling point of water in the hollow first cavity to a lowered boiling point at least 20° F. below the boiling point of water at atmospheric pressure (306). The process includes providing the hot steam from the oxidation reactor to a hollow second cavity of a second chamber that at least partially surrounds the hollow first cavity, such that the hot steam in the hollow second cavity causes water in the hollow first cavity to boil to cold steam at the lowered boiling point (308). The process includes moving a movable piston located within the hollow first cavity and that is in sealable contact with an inner wall of the first chamber along a length of the first chamber to mechanically move residual fuel in the hollow first cavity to the oxidation reactor, wherein the residual fuel remains in the first cavity after water in the hollow first cavity boils to cold steam before the residual fuel is moved to the oxidation reactor, wherein the residual fuel that is moved into the oxidation reactor provides the combustible fuel for oxidation in the oxidation reactor (310).

The process includes pumping liquid in and out of the hollow first cavity to cause the movement of the movable piston between a first position in which the fuel and water is loaded into the hollow first cavity and a second position in which the residual fuel is moved from the hollow first cavity to the oxidation reactor (312).

The techniques described herein have significant advantages. They facilitate the purification of a contaminated liquid (e.g., water) using waste heat and energy from an oxidation reactor, where the reactor is fueled with the contaminants extracted from the contaminated liquid.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A system comprising:
a supercritical water oxidation reactor configured to oxidize combustible fuel to produce heat and hot steam as a result of oxidation of the fuel;
a first chamber having a hollow first cavity configured to contain water and the fuel;
a vacuum pump operationally connected to the hollow first cavity and configured to reduce a pressure in the hollow first cavity to lower a boiling point of water in the hollow first cavity to a lowered boiling point below 192° F.;
a second chamber including a hollow second cavity that at least partially surrounds the hollow first cavity, the hollow second cavity being operationally connected to the supercritical water oxidation reactor to receive the hot steam from the supercritical water oxidation reactor, such that hot steam received from the supercritical water oxidation reactor into the hollow second cavity causes water in the hollow first cavity to boil to cold steam;
a movable piston located within the hollow first cavity and in sealable contact with an inner wall of the first chamber and configured to move along a length of the first chamber to mechanically move residual fuel in the hollow first cavity to the supercritical water oxidation reactor, wherein the residual fuel remains in the first cavity after water in the hollow first cavity boils to cold steam before the residual fuel is moved to the supercritical water oxidation reactor; and
a hydraulic pump operationally connected to the hollow first cavity and configured to pump liquid in and out of the hollow first cavity to move the movable piston between a first position in which the fuel and water is in the hollow first cavity and a second position in which the residual fuel is moved from the hollow first cavity to the supercritical water oxidation reactor.

2. The system of claim 1, further comprising a heat exchanger configured for receiving the cold steam from the hollow first cavity and condensing the cold steam into a liquid.

3. The system of claim 1, further comprising a steam condensate tank operationally connected to the hollow second cavity and configured for receiving condensate produced in response to heat transferred from the hot steam in the hollow second cavity to the water and fuel in the hollow first cavity.

4. The system of claim 1, further comprising a drive system operationally coupled to the supercritical water oxidation reactor and to the hollow second cavity between the supercritical water oxidation reactor and the hollow second cavity and configured for receiving the hot steam from the supercritical water oxidation reactor and converting energy in the hot steam into mechanical energy and then passing the hot steam to the hollow second cavity.

5. The system of claim 1, wherein the supercritical water oxidation reactor is configured such that the oxidation of the fuel occurs at a temperature of greater than 500° F. to produce the heat and hot steam.

6. The system of claim 1, wherein the lowered boiling point is below 102° F.

7. The system of claim 1, wherein the hollow first cavity includes a first end operationally coupled to the hydraulic pump and a second end operationally coupled to the vacuum pump, the first end and the second end being separated by the movable piston in the hollow first cavity.

8. The system of claim 1 wherein the movable piston includes stainless steel and a sealing surface on an outer surface of the piston, wherein the sealing surface seals against the inner wall of the first chamber, wherein the sealing surface is configured to remove condensate material from the inner wall of the first chamber.

9. The system of claim 1, wherein the first chamber includes at least one copper wall defining the hollow first cavity.

10. The system of claim 1, wherein the second chamber includes at least one copper wall defining the hollow second cavity.

11. A method comprising:
oxidizing combustible fuel in a supercritical water oxidation reactor to produce heat and hot steam as a result of oxidation of the fuel;
loading a hollow first cavity of a first chamber that is operationally connected to the supercritical water oxidation reactor with water and the fuel;
reducing a pressure in the hollow first cavity to lower a boiling point of water in the hollow first cavity to a lowered boiling point below 192° F.;
providing the hot steam from the supercritical water oxidation reactor to a hollow second cavity of a second chamber that at least partially surrounds the hollow first cavity, such that hot steam received from the supercritical water oxidation reactor into the hollow second cavity causes water in the hollow first cavity to boil to cold steam at the lowered boiling point;
moving a movable piston located within the hollow first cavity and that is in sealable contact with an inner wall of the first chamber along a length of the first chamber to mechanically move residual fuel in the hollow first cavity to the supercritical water oxidation reactor, wherein the residual fuel remains in the hollow first cavity after water in the hollow first cavity boils to cold steam before the residual fuel is moved to the supercritical water oxidation reactor, wherein residual fuel that is moved into the supercritical water oxidation reactor provides the combustible fuel for oxidation in the supercritical water oxidation reactor; and
pumping liquid in and out of the hollow first cavity to cause movement of the movable piston between a first position in which the fuel and water is loaded into the hollow first cavity and a second position in which the residual fuel is moved from the hollow first cavity to the supercritical water oxidation reactor.

12. The method of claim 11, further comprising condensing the steam from the hollow first cavity into a liquid.

13. The method of claim 11, further comprising receiving into a steam condensate tank that is operationally connected to the hollow second cavity condensate produced in response to heat transferred from the hot steam in the hollow second cavity to the of water and fuel in the hollow first cavity.

14. The method of claim 11, further comprising:
receiving into a drive system operationally coupled to the supercritical water oxidation reactor and to the hollow second cavity between the supercritical water oxidation reactor and the hollow second cavity the hot steam from the supercritical water oxidation reactor;
converting energy in the hot steam into mechanical energy; and
passing the hot steam to the hollow second cavity.

15. The method of claim 11, wherein the oxidation of the fuel in the supercritical water oxidation reactor occurs at a temperature of greater than 500° F.

16. The method of claim 11, wherein the lowered boiling point is below 102° F.

17. The method of claim 11, wherein the hollow first cavity includes a first end operationally coupled to a hydraulic pump that pumps the liquid in and out of the hollow first cavity and a second end operationally coupled to the vacuum pump, the first end and the second end being separated by the movable piston in the hollow first cavity.

18. The method of claim 11, wherein the movable piston includes stainless steel and a sealing surface on an outer surface of the piston, wherein the sealing surface seals against the inner wall of the first chamber, wherein the sealing surface is configured to remove condensate material from the inner wall of the first chamber.

19. The method of claim 11, wherein the first chamber includes at least one copper wall defining the hollow first cavity.

20. The method of claim 11, wherein the second chamber includes at least one copper wall defining the hollow second cavity.

* * * * *